May 21, 1968     M. J. BERARDI     3,384,240
ACTIVATED CHARCOAL FILTER ASSEMBLY HAVING BACKWASH MEANS
Original Filed March 24, 1964
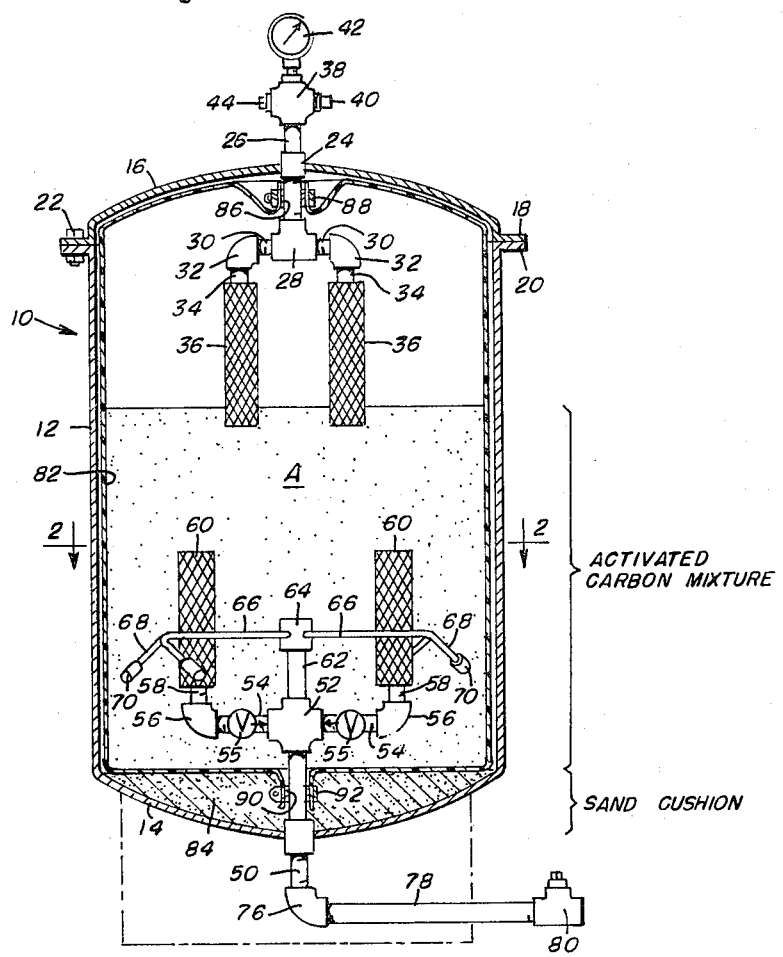
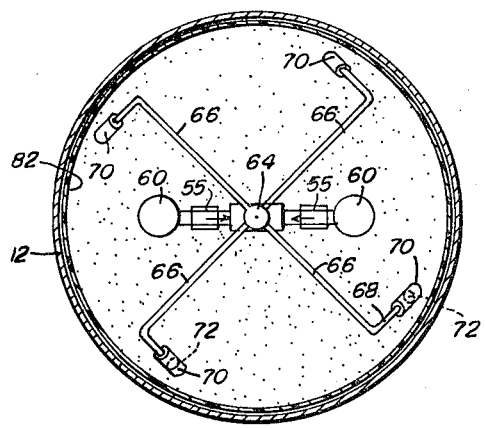
INVENTOR
MARTIN J. BERARDI
BY *Bemyer and Witherspoon*
ATTORNEYS

United States Patent Office 3,384,240
Patented May 21, 1968

3,384,240
ACTIVATED CHARCOAL FILTER ASSEMBLY
HAVING BACKWASH MEANS
Martin J. Berardi, 149 NE. 98th St.,
Miami Shores, Fla. 33138
Continuation of application Ser. No. 354,298, Mar. 24,
1964. This application Nov. 9, 1966, Ser. No. 593,221
3 Claims. (Cl. 210—136)

ABSTRACT OF THE DISCLOSURE

An improved liquid filtering assembly is described in the following specification which uses activated charcoal, and which includes an effective backwashing unit for periodically cleaning the activated carbon particles in the assembly.

---

This is a continuation of U.S. patent application Ser. No. 354,298, filed Mar. 24, 1964, now abandoned.

This invention relates to filters and more particularly to a liquid filtering and backwash unit built for long life.

It is an object of this invention to provide a filter for removing foreign matter from liquid in a highly efficient and economical manner.

It is another object of this invention to provide a filter and backwashing unit wherein the filter bed is composed of a mixture of various sizes of activated carbon particles and a backwashing assembly for efficiently removing foreign matter collected thereon.

It is yet another object to provide a filter having a backwashing means which expands and violently agitates the filter bed to cause the filter particles to rub against each other and by abrasion remove foreign matter deposited thereon.

It is a still further object of this invention to provide a liquid filtering and backwashing unit wherein the filter tank is provided with a plastic liner thus eliminating the need for expensive coating of the inner surface of the tank.

The above and other objects and advantages will become apparent when taken in conjunction with the following detailed description and drawings, showing by way of example a preferred embodiment of this invention and wherein:

FIG. 1 is a vertical cross sectional view of the device, and

FIG. 2 is a horizontal cross sectional view taken along line 2—2 of FIG. 1.

As shown in FIGS. 1 and 2 this liquid filtering and backwash unit comprises a cylindrical tank 10 having a vertical side wall 12 and a dome-shaped bottom 14. The upper end of the cylinder is closed by a dome-shaped top 16 having a peripheral flange 18 which engages a similar flange 20 on the vertical wall 12. The mating flanges 18 and 20 are held together by means of bolt and nut assemblies 22.

The top 16 has a centrally positioned hole 24 through which extends a vertical conduit 26 appropriately held therein.

Conduit 26 extends downwardly into the tank a short distance and terminates in a T-joint 28 from which radially extend horizontal conduits 30 and elbows 32 to which are connected vertical conduits 34 connected to and supporting cylindrical porous ceramic elements 36.

The portion of conduit 26 extending above and outside the top 16 terminates in a cross connection 38. The fluid to be filtered enters through horizontal side connection 40 and a pressure gage 42 is connected at the top connection. The other side connection 44 may be used to exhaust backwash liquid in the backwashing operation.

The tank bottom 14 has a centrally positioned hole through which extends vertical conduit 50 suitably held therein. The portion of the conduit 50 wthin the tank terminates in a cross connection member 52 with horizontal conduits 54—54 extending radially outwardly therefrom. These conduits 54 contain check valves 55 and terminate in elbows 56 directed so that their outer ends extend upwardly to receive conduits 58 which in turn are connected to and support vertically extending cylindrical ceramic liquid distribution elements 60.

A vertical conduit 62 is connected to and extends from the upper outlet of cross member 52. Conduit 62 is connected to and supports a backwashing assembly comprising an end cap 64 from which radially and horizontally extend a plurality of small conduits 66 whose ends are bent at approximately a 90° angle so that there is a short length 68 of the conduit 66 normal to the conduit 66. This short length 68 terminates in a nozzle 70 which contains a check valve 72. It should also be noted that the conduit 68 extends downwardly from the horizontal at approximately 45°.

Conduit 50 has a portion extending downwardly on the outside of the tank bottom 14, said conduit terminating in an elbow 76 having a conduit 78 extending horizontally therefrom and is connected to a valve 80.

A plastic liner 82 is placed within the tank in close proximity to the top and side walls and is spaced from and supported at the bottom by means of a bed of sand 84. The liner has an opening at its top for the reception of conduit 26. It will be noted that the liner is watertightly connected to the conduit 26 by means of an annular seal 86 and a clamp 88. The bottom of the liner likewise has an aperture which receives conduit 50 and is water-tightly connected thereto by an annular seal 90 and clamp 92.

Within the liner there is placed the filtering medium which in this instance is a mixture of various sizes of activated carbon particles. The filtering material fills over half of the available space within the filtering chamber as indicated in FIG. 1. Thus the backwash nozzles 70 and the ceramic elements 60 are completely covered with the activated carbon while the upper ceramic elements 36 are only partially covered at their lower end portions.

The activated carbon particles of various sizes which comprises the filter bed each perform a useful function. For example, the largest particles help maintain a fairly porous bed and also serve to filter out large elements of foreign matter while the somewhat small activated carbon particles filter out smaller elements of foreign matter and the smallest activated carbon particles perform the necessary function of taking out the most minute foreign matter. Particles sizes of activated carbon may range from 10 to 50 screen mesh.

In operation, liquid to be filtered enters through connection 40 and proceeds downwardly through conduit 26, T 28, elbow 32, conduit 34 and out through the many pores in the ceramic element 36. The liquid is filtered by the activated carbon in filter bed A and proceeds to discharge through porous ceramic elements 60, conduit 58, elbow 56, conduit 54, check valve 55, cross member 52, conduit 50, elbow 76, conduit 78 and valve 80.

As the filtering process continues the filter bed A will become loaded with foreign matter. Such will be indicated by pressure gage 42 which will show a rise in back pressure whereupon the backwashing operation should be started. In the backwashing operation, backwashing liquid enters conduit 78, passes through elbow 76, conduit 50, cross pipe 52, conduit 62, end cap 64, conduits 66, 68, check valve 72 and out nozzle 70. It should be noted that the nozzles are directed tangentially and downwardly at approximately 45° to the horizontal. This angular direction serves to agitate the filter bed and causes it to expand so that it fills the major portion of the tank. This very active agitation causes the activated carbon particles to rub against each other and by abrasion remove a large portion of the foreign matter collected thereon. Of course, the washing action of the backwashing liquid is also important in further cleaning and removing the foreign matter collected on the carbon particles. The backwash liquid with the foreign matter removed from the carbon particles entrained therewith flows out through ceramic elements 36 and then through conduit 34, elbow 32, conduit 30, T 28, conduit 26, cross connection 38 and out through opening 44.

The check valves 55 in conduits 54 are active to prevent flow of backwashing liquid out through these conduits while the check valves 72 in nozzles 70 are useful in preventing flow of filtered liquid through the nozzles. Appropriate valving and similar plumbing arrangements may be provided to accommodate various types of installations.

The plastic liner 82 while not a new concept in and of itself, nevertheless makes it possible to provide a filter of this type and size for much less money because it is thus not necessary to provide the very expensive corrosion resistance coating conventionally employed.

I claim:
1. A filtering assembly for filtering liquids including: an enclosed tank; a filter bed of activated carbon particles of different sizes positioned in said tank and partially filling said tank; an upper conduit extending into said tank; at least one porous liquid distributing member connected to said upper conduit and supported in said tank in a position at least partially above the top of said filter bed; a lower conduit extending into said tank and including a centrally located vertical portion; at least one porous liquid receiving member connected to said lower conduit and supported in said tank in a position below the top of said filter bed; a check valve interposed in the connection between said liquid receiving member and said lower conduit; a plurality of additional conduits connected to said centrally located vertical portion of said lower conduit and extending radially therefrom, each of said additional conduits having a bent-over end portion disposed at approximately 45° to the horizontal and at approximately 90° to the axis of the corresponding one of said additional conduits; a nozzle at the extremity of each of said bent-over end portions; a further check valve in each of said nozzles; means including a two-way valve connected to said upper conduit for introducing liquid to be filtered into said tank through said upper conduit and through said liquid distributing member into said bed of activated carbon particles and through said liquid receiving member out through said lower conduit; and means including a two-way valve connected to said lower conduit for introducing backwashing liquid into said tank through said lower conduit and through said nozzles, said backwashing liquid being directly by said nozzles downwardly and circumferentially with respect to said tank to agitate the activated carbon particles in said filter bed and to move said filter bed upwardly from the bottom of said tank, said backwashing liquid being received by said porous liquid distributing member and discharged out through said upper conduit.

2. The combination defined in claim 1 in which said liquid distributing and liquid receiving members each include porous ceramic elements.

3. The combination defined in claim 1 and which includes a plastic liner in said tank.

References Cited

UNITED STATES PATENTS

| | | | |
|---|---|---|---|
| 377,390 | 2/1888 | Jewell | 210—279 X |
| 509,887 | 12/1893 | Fischer et al. | 210—496 X |
| 949,455 | 2/1910 | Usher | 210—279 X |
| 1,554,129 | 9/1925 | Ryan | 210—279 X |
| 2,057,237 | 10/1936 | Hoop | 210—290 X |
| 2,304,109 | 12/1942 | McGill | 210—279 X |
| 2,364,775 | 12/1944 | Brice | 210—290 X |
| 2,461,619 | 2/1949 | Wolcott | 210—279 |
| 2,643,772 | 6/1953 | Martin | 210—488 X |
| 3,244,197 | 5/1966 | Stilwell | 210—279 X |

REUBEN FRIEDMAN, *Primary Examiner.*

F. SPEAR, *Examiner.*